Figure 1:
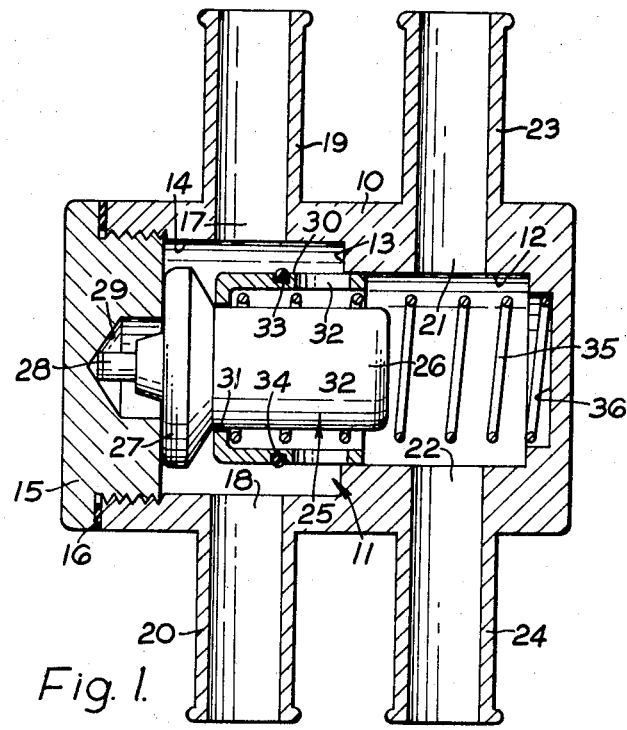

United States Patent

Aziz

[15] 3,682,380
[45] Aug. 8, 1972

[54] TEMPERATURE CONTROL IN FLUID SYSTEMS

[72] Inventor: Ahmad Aziz, 30 Corfton Rd., Ealing, London, W.5, England

[22] Filed: Sept. 10, 1970

[21] Appl. No.: 63,898

[52] U.S. Cl. ............................................. 236/34.5
[51] Int. Cl. .................................................. F01p 7/16
[58] Field of Search .............................. 236/34.5, 93

[56] References Cited

UNITED STATES PATENTS

| | | | |
|---|---|---|---|
| 2,423,398 | 7/1947 | Martin-Hurst | 236/34.5 |
| 2,469,212 | 5/1949 | Shaw | 236/34.5 |
| 2,480,676 | 8/1949 | Shaw | 236/34.5 |
| 2,725,069 | 11/1955 | Geddes | 236/34.5 X |
| 3,096,022 | 7/1963 | Holley | 236/34.5 |

Primary Examiner—Edward J. Michael
Attorney—Kenwood Ross

[57] ABSTRACT

The invention provides a valve comprising a body having a central bore embodying a reduced-diameter seating, a pair of inlet ports and a pair of outlet ports connecting to the central bore for admission of fluid to and from the bore, thermosensitive means disposed in the bore in the path of fluid flow and having associated therewith a spring-loaded valve member displaceable under the influence of the thermosensitive means, between a first position (with a pair of inlet ports in communication with the bore and at least one of the outlet ports) and a second position (cooperating with the seating to divide the bore into two chambers with each of the inlet ports of the pair communicating through a respective one of the chambers with a respective one of the outlet ports).

7 Claims, 2 Drawing Figures

INVENTOR
AHMAD AZIZ
BY Kenwood Ross &
Chester E. Flavin
ATTORNEYS.

TEMPERATURE CONTROL IN FLUID SYSTEMS

This invention relates to the control of the temperature of lubricating oil or other fluid in a circuit or system wherein the fluid is in circulation and is heated (e.g., by heat dissipation), and wherein it is desired to prevent the fluid from exceeding a predetermined temperature or to maintain its temperature, within a predetermined range.

I have already proposed, in the specification of my prior United States patent application Ser. No. 796,762 now abandoned, a form of valve which, when incorporated in the lubricating oil circuit of an engine, serves to control the flow of the oil through a heat exchanger or cooler, or otherwise to maintain its temperature within a predetermined range. The valve, as claimed in such prior application, comprises in combination: a valve body having a central cylindrical bore and a pair of connecting inlet ports for the admission of fluid to the bore and a pair of connecting outlet ports for egress of fluid from the bore; a thermosensitive means located in the path of fluid flow through the bore; and a spring loaded valve member disposed in the bore of the valve body for regulating the fluid flow through the connecting ports and being displaceable axially in the bore of the valve body unisonly with the thermosensitive means between a first position with the pair of inlet ports being in communication with the bore and with at least one of the outlet ports and a second position with the bore being divided into two chambers with each of the inlet ports of the pair thereof communicating through one of the chambers with one of the outlet ports of the pair thereof.

In the specific form of valve described in said prior application, the thermosensitive device is in the form of a capsule containing wax or other suitable material which expands on heating, to extend a needle of the device, which needle, by reaction, serves to displace the capsule which carries the valve member.

A disadvantage of this form of the valve is that there is a possibility of the capsule and valve member tilting in the bore, with the result that there may be leakage past the valve member when it is in its position dividing the bore into two chambers. Another disadvantage is that the ports, or at least one of them, must be lesser in diameter than the throw of the capsule, if the valve is to be operative and the valve member is to be able to assume the two enumerated positions.

An object of this invention is to provide a construction of valve as above discussed wherein these disadvantages are obviated. With this object in view, the present invention provides such a hydraulic valve wherein the valve member, when in its second position dividing the bore into two chambers, seals with a reduced diameter seating in said bore.

The said reduced diameter seating may be provided by a reduced diameter portion of the bore itself, or by a seating disc located in the bore at a position intermediate between its ends.

Figure 2:
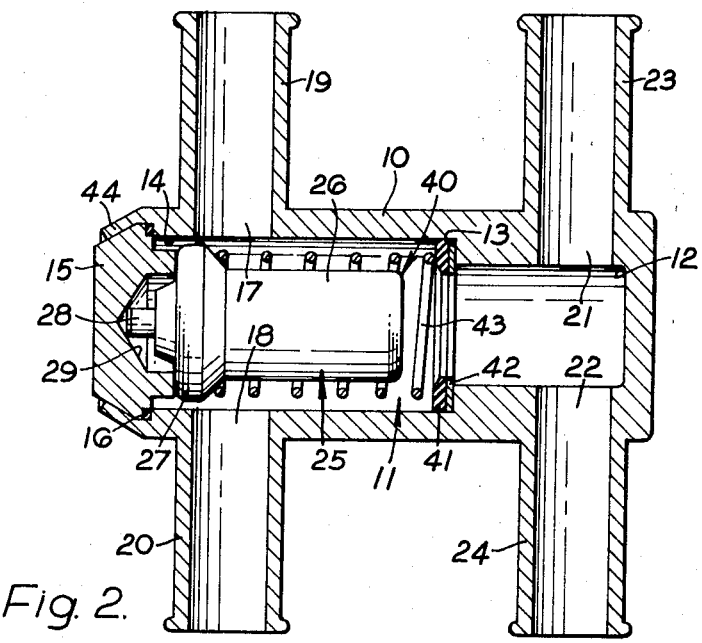

In order that the invention may be fully understood, it will be described further, by way of example, with reference to the accompanying drawings, in which:

FIG. 1 is a cross-sectional elevation of a first embodiment of the valve of the present invention; and FIG. 2 is a view similar to FIG. 1 but showing a second embodiment.

Similar reference numerals have been allocated to similar parts in the two figures.

Dealing firstly with the embodiment illustrated in FIG. 1 of the drawings, the valve here illustrated comprises a body 10 having a longitudinal bore, indicated generally by the reference numeral 11. As shown, the bore 11 includes a reduced diameter portion 12 merging by a transition, forming a shoulder 13 with a wider diameter portion 14 part of which is screw threaded to receive a closure plug 15, having a sealing washer 16 which axially closes the bore.

Corresponding ports 17 and 18 (which may be aligned as shown, or may be offset relative to one another), having respective connecting nipples 19, 20, connect with the wider diameter portion 14 of the bore, and similar corresponding ports 21, 22, having respective connecting nipples 23, 24, connect with the reduced diameter portion 12.

A thermosensitive device in the form of a wax capsule 25 is located in the bore 11. This capsule 25 comprises a generally cylindrical housing 26 having a flared head 27 at one end, an axially disposed plunger 28 projecting from the head end of the housing 26 to engage into a recess 29 in the closure plug 15. Upon the capsule 25 being subjected to increase in temperature, the plunger 28 extends from the housing 26.

A cup-like sleeve 30 surrounds the housing 26 of the capsule 25, abutting the flared head 27 by an inwardly directed circumferential lip 31 provided thereon, and holes 32 are provided through such sleeve 30 adjacent to its end remote from the lip 31. This sleeve 30 constitutes the valve member of the valve and has therearound a resilient O-sectioned sealing ring 33 which locates in a circumferential groove 34 about midway along the sleeve 30.

The sleeve 30 is of an outside diameter such as to be a smooth sliding fit in the reduced diameter portion 12 of the bore 11 and such sleeve 30 is urged to its illustrated position wherein it just locates by its non-lipped end into such reduced diameter bore portion 12 by a helical spring 35 which abuts by one end against the lip 31 of the sleeve 30 and by its other end against the end of the body 10 remote from the plug 15, locating in a respective recess 36 therein. In the illustrated condition of the valve, all of the four ports 17, 18, 21 and 22 are open to the bore 11. If, however, fluid at an elevated temperature is present in the bore 11, the plunger 28 is caused to extend, thereby displacing the housing 26 of the capsule 25 and the sleeve 30 to the right as viewed in the drawings against the action of the spring 35. As the sleeve 30 progressively enters the reduced diameter portion 12 of the bore 11, the amount of the holes 32 exposed to the wider diameter portion 14 of the bore 11 (which holes 32 provide communication between the wider diameter and smaller diameter portions 14 and 12 of the bore) progressively decreases, until eventually the sealing ring 33 enters the reduced diameter portion 12 of the bore, which provides a seating surface for the ring 33, thereby sealing the bore portion 14 from the bore portion 12. Accordingly, the bore 11 is then divided into two separate chambers separated by the sealing ring 33 of the valve member, and the ports 17, 18 are isolated from the ports 21, 22.

As has already been described in detail in the specification of my prior patent application Ser. No. 796,762 the valve is of particular utility in relation to the lubricating system of an internal combustion engine e.g., of a motor car, and can be used in combination with a heat exchanger to control the temperature of the oil in such a system.

In the case where the oil is required to be cooled as soon as it reaches a predetermined temperature, so that it is maintained at a constant temperature approximating to such predetermined temperature, any one of the ports can be connected by its nipple to the lubrication system to receive oil therefrom and constitute an inlet port of the valve and either of the two ports not aligned therewith will then be connected by its nipple to the lubrication system to feed oil back thereto and constitute an outlet port of the valve. The remaining two ports are then connected to a heat exchanger in the form of a radiator or the like to constitute respectively an inlet port and an outlet port of the valve to the heat exchanger. As a practical example the port 18 may be the inlet port for receiving oil from the lubricating system and the port 22 may be the outlet port connecting back to the lubricating system, whilst the ports 17 and 21 will be connected as inlet and outlet ports (or vice versa) to the heat exchanger.

Whilst the oil coming from the lubricating system is cold or below the predetermined temperature, the valve will be substantially as illustrated, permitting the oil to pass straight from the inlet port 18, through the bore 11, to the outlet port 22, with the heat exchanger effectively by-passed and having no significant cooling effect on the oil.

As soon as the oil reaches the predetermined temperature and the capsule's housing 26 and sleeve 30 have been displaced by reason of extension of the plunger 28 as already described, the ports 18 and 17 are isolated from the ports 21 and 22. Thus, the oil entering by the inlet port 18 must pass to the heat exchanger by way of the port 17 and back to the valve by way of the port 21 whereafter it returns to the lubricating system through the port 22.

If the reverse effect should be required, i.e., if it should be desired for oil from the lubricating system initially to pass through a heater connected to the ports 17 and 21, and subsequently to be disconnected from such heater when a predetermined temperature is achieved, the disposition of the capsule 25, sleeve 30 and spring 35 will be reversed in its position in the bore 11 as compared with its illustrated case, so that the wider and reduced diameter portions 14, 12 of the bore 11 are initially isolated from one another and become opened to one another when the capsule's plunger 28 has become extended. The valve can, if desired, also be employed as a mixer valve to give a constant intermediate temperature of a mixed fluid flow. For instance the port 18 can be connected to a source of hot fluid and the port 22 to a source of cold fluid, the port 21 providing an outlet for the resultant mixed flow and the remaining port 17 being blanked off. Such an application may be desirable, for example, where it is required to exercise precise and rapid control of the fluid temperature passing out of the valve by metering the hot and cold fluids which may originate from a common source and be divided to flow respectively through a heater and a cooler to the ports 18 and 22. The valve then serves to determine the proportions of the fluid, from the common source, passing respectively through the cooler and the heater.

To prevent excessive pressures occuring in this embodiment of the valve in the event of blockage of the heat exchanger, and/or to provide certainty of lubricant flow if the heat exchanger is blocked, a pressure relief valve may be incorporated in the sleeve 30.

FIG. 2 illustrates a modified construction of the valve whose operation is very similar to that of FIG. 1. In this case, however, no sleeve is provided around the housing 26 of the capsule 25. Instead, the housing 26 itself constitutes the valve member, its rounded annular transition 40 between its cylindrical surface and its end remote from the plunger 28 forming a seat which confronts a resilient sealing ring 42 held between a backing washer 41 and the shoulder 13 in the bore 11 by a helical spring 43 one end of which abuts the washer 41 and the other end of which abuts the flared head 27.

This embodiment also differs from that of FIG. 1 in that its closure plug 15 is retained in position by the material of the body being swaged over the plug 15 at 44 instead of the latter being screw-threaded, and this arrangement could, of course, be used in the FIG. 1 embodiment whilst the screwed closure plug could be used in the FIG. 2 construction.

It will be understood that in this embodiment, when the capsule 25 is subjected to an elevated temperature extension of the plunger 28 causes the housing to be displaced to the right in the drawing to bring the seat 40 into sealing engagement with the seating ring, thereby to convert the bore 11 from a single chamber into two chambers isolated from one another. The arrangement may, if desired, be such that the housing 26 of the capsule 25 actually enters the sealing ring 42 so that the latter seals with the external cylindrical surface of the housing 26.

With this particular construction the sealing ring may be dimensioned relative to the back washer 41 and to the reduced diameter portion 12 of the bore 11 to be unsupported at its inside diameter so that when it is sealing with the housing 26 any excessive pressure building up on the bore 11 will be released as a result of deformation of the ring 42.

The invention is not restricted to the precise details of the foregoing examples and variations may be made thereto within the scope of the following claims. For instance, in the embodiment of FIG. 1, the sealing ring 33 can be omitted if the sleeve 30 is made a very close fit in the reduced diameter portion 12 of the bore 11.

I claim:

1. A hydraulic valve for controlling the temperature of a fluid in a circuit comprising;
   a valve body having a central bore:
   a reduced-diameter seating at a location between the ends of the central bore;
   a pair of connecting inlet ports for the admission of fluid to the central bore connecting with the central bore one to each side of the seating;
   a pair of connecting outlet ports for the admission of fluid from the central bore connecting with the central bore one to each side of the seating;
   a thermosensitive means located in the central bore in the path of fluid flow therethrough;
   a spring-loaded sleeve valve member disposed in the central bore and displaceable by the thermosensitive means in a sliding fit between a first position clear of the seating and permitting communication of the pair of inlet ports with the central bore and at least one of the outlet ports, and a second position cooperating with the seating and dividing the central bore into two chambers with each of the inlet ports communicating through a respective one of the chambers with a respective one of the outlet ports.

2. A valve as set forth in claim 1, the thermosensitive means comprising a wax capsule including a plunger extending from a housing when the capsule is subjected to an elevated temperature.

3. A valve as set forth in claim 2 the valve member being in the form of a sleeve surrounding the capsule and slidably locating in a reduced diameter portion of the bore, the reduced diameter portion providing the seating.

4. A valve as set forth in claim 3, the sleeve carrying a circumferential sealing ring engageable with the seating in the second position of the valve member.

5. A valve as set forth in claim 2, the housing of the capsule constituting the valve member and the reduced diameter seating being provided by a sealing ring located against a shoulder in the bore.

6. A valve as set forth in claim 5, the capsule being loaded by a spring serving also to hold the sealing ring against the shoulder.

7. A valve as set forth in claim 6, the sealing ring, when engaged by the valve member, being capable of deforming to permit release of excess pressure.

* * * * *